United States Patent
Jelinek et al.

[15] 3,694,894
[45] Oct. 3, 1972

[54] METHOD OF INSERTING A SEAL IN A FACE-CUT GROOVE

[72] Inventors: Jerry G. Jelinek, Whittier; Edward Reinsch, Palos Verdes, both of Calif.

[73] Assignee: Parker-Hannifin Corporation, Cleveland, Ohio

[22] Filed: Jan. 14, 1970

[21] Appl. No.: 2,775

[52] U.S. Cl. ........................29/451, 29/235, 269/21, 277/1
[51] Int. Cl. ..................................B23p 11/02
[58] Field of Search ..29/451, 450, 453, 235; 269/21; 277/1; 220/46 R; 51/235

[56]   References Cited

UNITED STATES PATENTS

| | | | |
|---|---|---|---|
| 1,839,429 | 1/1932 | Weaver | 29/453 UX |
| 2,276,542 | 3/1942 | Kovanda | 29/235 UX |
| 2,443,987 | 6/1948 | Morrison et al. | 269/21 |
| 2,462,493 | 2/1949 | Hamer | 220/46 R X |
| 2,715,300 | 8/1955 | Dorner | 51/235 X |
| 2,763,055 | 9/1956 | Hardy | 29/450 |
| 2,778,072 | 1/1957 | Palisca | 220/46 R UX |
| 2,807,079 | 9/1957 | Josephson | 29/235 |
| 2,924,008 | 2/1960 | Haushalter | 29/450 UX |
| 3,289,286 | 12/1966 | Belanger | 29/450 UX |
| 3,581,379 | 6/1971 | Drobilits | 29/450 |

*Primary Examiner*—Charlie T. Moon
*Attorney*—Diller, Brown, Ramik & Holt

[57]   ABSTRACT

This invention relates to a method of and a device for enabling the insertion of a sealing element into a face-cut groove with a minimum of time and effort, together with the accuracy and quality required. This particularly has to do with practical field maintenance of seals while eliminating all problems usually encountered during installation of prior insertable seals. This is accomplished by means of a fixture which holes the seal element by means of an applied vacuum, and the utilization of the fixture to insert the seal element into a groove quickly and accurately.

7 Claims, 6 Drawing Figures

PATENTED OCT 3 1972 3,694,894

INVENTORS
JERRY G. JELINEK
& EDWARD REINSCH

By Diller, Brown, Ramik & Holt
ATTORNEYS

METHOD OF INSERTING A SEAL IN A FACE-CUT GROOVE

This invention relates in general to new and useful improvements in means of and apparatus for inserting seals in face-cut grooves.

The ultimate in reliability for face-type sealing is a molded-in-place seal wherein the seal element is physically molded directly into a groove. However, the fact that the seal element is directly molded in place has proven disadvantageous when the seal element is to be placed. For example, when it is desired to place the seal element in an aircraft door, it is necessary to remove the door and perform the seal replacement remote from the aircraft. From a practical standpoint, this necessitates a large stock of replacement doors. This problem has existed for many years notwithstanding continuous requests for a better seal arrangement.

The obvious solution to the problem is the insertion of prior molded seal element into the groove. However, heretofore many formidable problems have been encountered in the installation of such seal elements which include the following:

1. Accurate location of the seal element in the groove.
2. Limited or obscured accessibility.
3. Seals with irregular cross sectional shape (other than simple circular or rectangular shapes) pose severe installation problems.
4. Bunching or stretching of the seal element when large peripheral overall lengths are involved.
5. Excessive time required in placing the seal element.
6. Danger of pinching a portion of the seal element that is not entirely engaged within the groove.
7. Difficulty of holding the seal element in place after insertion when adhesive is required, particularly when room must be left in the groove to allow for deflection of the seal element.
8. Contoured or curved surfaces present a distinct hold down problem during installation of seal elements.
9. Seals with intersecting lines of contact of seal elements are very difficult, if not impossible, to achieve even with usual insertable type seal elements.

It is particularly pointed out here, that because of the above listed problems, not only may pinching occur or the location of the seal in its groove be improper, but, the seal element may fall out of the groove entirely and the member replaced without the sealing element being present without being detected by the installer.

Because of the above listed problems, it is proposed to install and replace seal elements in face cut grooves by providing a fixture which is particularly contoured to effect the initail shaping of a seal element in accordance with the groove and while the outline of the seal element is maintained, utilizing the fixture to forcibly place the seal element in the groove.

It is proposed that the outline of the seal element be maintained by holding the seal element in place on the fixture through vacuum and after the seal element has been positioned in the groove, forcibly separating the seal element and the fixture by applying fluid pressure.

It is further proposed that the seal element be of a generally T-shape cross section and that the fixture have a rib which conforms generally to the outline of the groove and which rib has a groove formed therein in which the projecting portion of the seal element is received and wherein the projecting portion may be drawn down into the groove of the rib to transversely distort the seal element and reduce the width of the exposed surface of the seal element to facilitate the initial movement of the seal element into the groove into which it is to be placed.

With the above and other objects in view that will hereinafter appear, the nature of the invention will be more clearly understood by reference to the following detailed description, the appended claims and the several views illustrated in the accompanying drawing.

Figure 1:
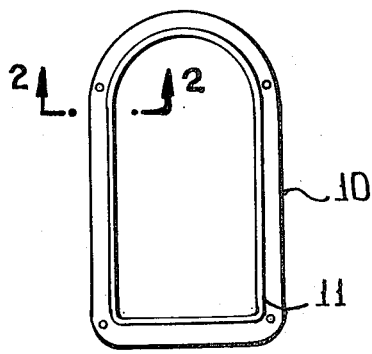
FIG. 1 is a plan view of a member to be sealed in accordance with this invention.

Referring now to the drawing in detail, in FIG. 1 there is shown a typical member 10 which is to be sealed relative to other structure. The member 10 has a peripheral groove 11.

Figure 2:
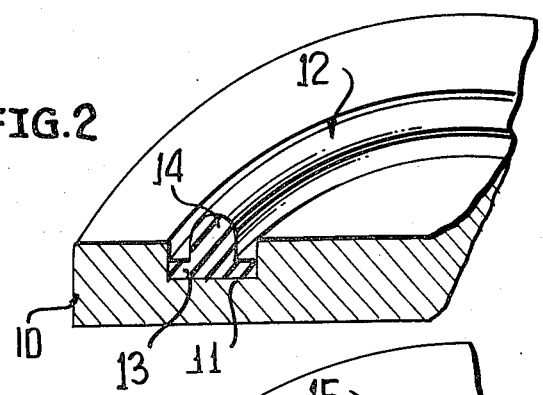
FIG. 2 is an enlarged fragmentary schematic view showing a typical seal installation.

Member 10 (FIG. 2) is provided with a seal element 12 placed in groove 11. Seal element 12 is preferably T-shaped in section and includes a base 13 which is fully seated in groove 11 and a projecting portion 14 in the form of a bead or stem which projects above the surface of the member 10 for engagement with and compression by a companion member (not shown) to facilitate the sealing of the two members.

Figure 3:
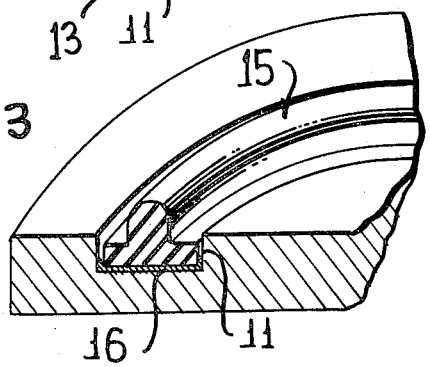
FIG. 3 is a view similar to FIG. 2 showing a modified form of seal installation.
Figure 4:
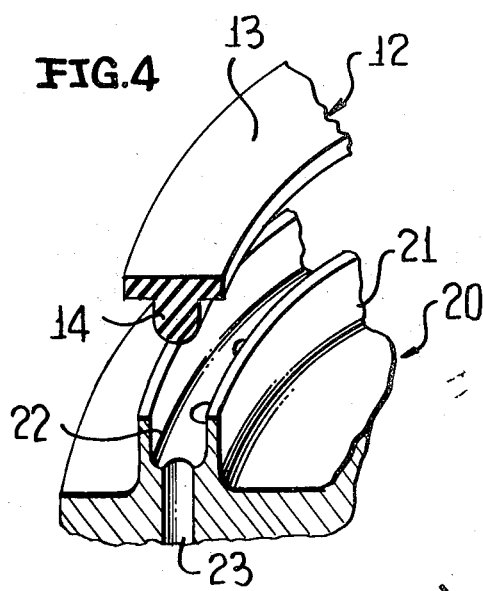
FIG. 4 is a fragmentary schematic perspective view showing the general details of a fixture and the initial relationship of its seal element thereto.

Base 13 of seal element 12 is of a width to be snugly received in groove 11 so as to facilitate the retention of seal element 12 in groove 11. However, a seal element, such as seal element 15 may have a base of slightly lesser width than groove 11 and is held in place by means of suitable adhesive 16 (FIG. 3).

It is pointed out here that when there is interference fit between seal element 12 and groove 11, base 13 may have a width of from 5 to 15 percent greater than the width of groove 11. On the other hand, with seal element 15 where the base thereof is narrower than groove 11, the width differential may be on the order 0.005 to 0.015 inch.

In order to facilitate the ready insertion of seal elements 12 and 15, a fixture, generally identified by the numeral 20, is provided. Fixture 20 has an upstanding rib 21 of a contour corresponding to the contour of groove 11, but slightly narrower than groove 11. Rib 21 is generally U-shaped in transverse section and is provided with a centrally located continuous groove 22. Groove 22 has opening thereinto a plurality of ports 23 connected to a central passage 24 by individual passages 25 (FIGS. 5 and 6).

Passage 24 is coupled to a control valve 26 for selectively applying to passage 24 a vacuum or fluid pressure and venting passage 24. Also, as shown in FIG. 6, fixture 20 may be provided with aligning pins 27 engageable with member 10 to align fixture 20 and the seal element carried thereby with member 10.

Figure 5:
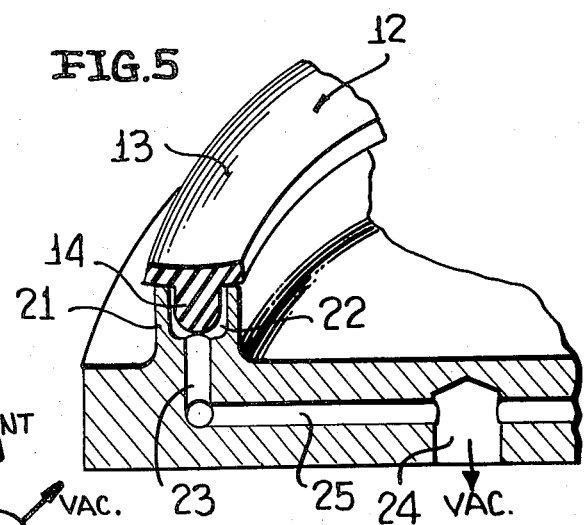
FIG. 5 is a view similar to FIG. 4 and shows the seal element contained in place on the fixture ready for installation into a groove.

Referring now to FIG. 5, it will be seen that groove 22 is of a greater depth than projecting portion 14 whereby when a vacuum is drawn in groove 22 seal element 12 is distorted in transverse section and the exposed surface of base 13 is temporarily decreased in width to be less than the width of groove 11. This facilitates the entry of seal element 12 into groove 11 notwithstanding the interference fit therebetween.

Figure 6:
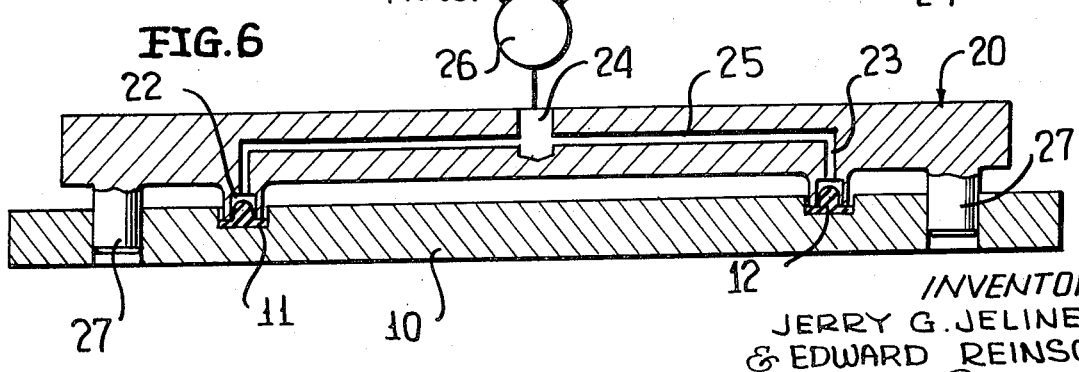
FIG. 6 is a schematic sectional view taken through the fixture and the member of FIG. 1 and shows a seal element being applied.

Seal elements are mechanically forcible into groove 11 by fixture 20 utilizing rib 21, as shown in FIG. 6. After a seal element has been placed in groove 11, the seal element, such as seal element 12, is separated from fixture 20 by applying fluid pressure into groove 22. This also assures firm seating of the seal element in the groove 11.

It is to be understood that fixture 20 can be transported anywhere and in any position without danger of dislodging seal elements. If an adhesive need be applied, this operation can be conveniently performed while the seal element is held inverted in fixture 20. Fixture 20 may be utilized to hold the seal element in place until the adhesive has set. In addition, since fixture 20 is automatically alignable with the member to which seal elements are to be applied, accuracy of alignment of seal element and positioning thereof is assured. Further, since a seal element may be loosely aligned with groove 21 of fixture 20 under readily accessible conditions, the usual gathering, bunching or stretching of seal elements is eliminated.

It is also pointed out here that a fill relationship of 90 percent or better between the total volume of the seal element as compared to the total volume of groove 11 should be maintained for providing effective seals.

Although a seal element having a T-shaped cross section is preferred, it is to be understood that this invention is not so limited and that minor variations may be made in both the fixture and the method of installing the seal element without departing from the spirit and scope of this invention, as defined by the appended claims.

We claim:

1. A method of applying a seal element in a facecut groove comprising the steps of conforming the seal element to the outline of the groove, utilizing a vacuum and retaining the outline of the seal, while retaining the outline of the seal element aligning the seal element with the groove, and thereafter inserting the seal element into the groove.

2. The method of claim 1 with said seal element insertion being at least in part accomplished by fluid pressure.

3. The method of claim 1 with the seal element being transversely deformed by the action of the vacuum thereon to temporarily reduce the width of that surface thereof to be placed in a groove thereby facilitating the insertion of the seal element.

4. A method of applying a T-cross sectional seal element in a facecut groove of a component wherein said groove is of a configuration other than a straight line configuration, said method comprising the steps of providing a seal element inserting member and forming thereon a projection of the same configuration as the groove with the projection also having a groove therein, conforming the seal element to the outline of said projection and seating the seal element on the projection with a portion of the seal element being received in the groove of the projection, aligning the projection with the facecut groove while retaining the seal element on the projection in alignment therewith, and then utilizing the projection inserting the seal element into the facecut groove in seating relation.

5. The method of claim 4 wherein the projection is narrower than the facecut groove and with the projection being inserted in the facecut groove in the positioning of the seal element.

6. The method of claim 4 together with the step of drawing a vacuum within the projection groove and thereby effecting said maintaining of the seal element in alignment with the projection.

7. The method of claim 6 wherein the projection groove is deeper than that portion of the seal element received therein, and with the applied vacuum being sufficiently great to draw the seal element into the projection groove and temporarily transversely deforming the seal element and reducing the seal element thereby facilitating the insertion of the seal element in the facecut groove.

* * * * *